Feb. 17, 1931. K. L. HANSEN 1,792,739
DYNAMO ELECTRIC MACHINE
Filed Dec. 17, 1928 2 Sheets-Sheet 1

INVENTOR
*KLAUS L. HANSEN*
BY
*Arthur R. Woolfolk*
ATTORNEY

Feb. 17, 1931.  K. L. HANSEN  1,792,739
DYNAMO ELECTRIC MACHINE
Filed Dec. 17, 1928  2 Sheets-Sheet 2

INVENTOR
KLAUS L. HANSEN
BY
Arthur R. Woolfolk
ATTORNEY

Patented Feb. 17, 1931

1,792,739

UNITED STATES PATENT OFFICE

KLAUS L. HANSEN, OF MILWAUKEE, WISCONSIN

DYNAMO-ELECTRIC MACHINE

Application filed December 17, 1928. Serial No. 326,435.

This invention relates to dynamo electric machines and is particularly directed to a machine adapted to convert electrical energy from A. C. to D. C.

Various methods have been employed for effecting this conversion, and they may be roughly grouped as a synchronous converter, a dynamotor, a motor generator, and a motor-converter.

While a synchronous converter has a low first cost, high efficiency, and low resistance loss, it, nevertheless, has an approximately fixed ratio of A. C. voltage to D. C. voltage. Even if the D. C. voltage is varied through a small range, the power factor is varied, which is obviously a disadvantage.

With a dynamotor, two distinct windings on the armature are required, and this not only adds to the cost of manufacture, but increases the resistance loss. Further, the D. C. voltage can be varied only through a limited range, and when so varied, alters the power factor.

While the D. C. voltage may be controlled with a motor generator set, there is a relatively high loss, due to the fact that two distinct machines are employed, and also the initial expense is considerably higher than with the other types of machines mentioned.

The motor converter, or as it is sometimes called, the cascade-converter, is a two-machine structure. One of the machines consists of a stator similar to the stator of an induction motor and cooperating with a wound rotor, the stator being the primary and the rotor being the secondary. The other machine has a stationary D. C. field structure cooperating with a rotor which is constructed in a manner identically similar to the armature of a rotary converter, such rotor being the primary with reference to the incoming A. C. energy supply. The frequency of the alternating current supplied the rotor of the second machine is always less than line frequency.

The motor-converter shares with the dynamotor the lack of flexibility in varying the D. C. voltage without disturbing the power factor at the A. C. terminals.

In many cases, it is desirable to have a variable D. C. voltage, as for example, in the Ward-Leonard system, arc welding, and other applications.

This invention is designed to overcome the defects of the machines as noted above, and objects of this invention are to provide a machine for converting electrical energy from A. C. to D. C. in a novel manner to secure the advantages of both the synchronous converter and the motor generator, while avoiding their disadvantages.

Further objects of this invention are to provide a machine for converting electrical energy from A. C. to D. C., which is so constructed that the machine may readily be designed to provide a normal D. C. voltage equal to, greater, or less than that of the A. C. supply; in which the D. C. voltage may be varied through any range desired without altering the power factor; in which a part of the machine acts not only as a synchronous motor, but also as a transformer which may have any ratio desired between its primary and secondary windings; in which the secondary windings of the machine are so connected to the armature of the D. C. portion of the machine that, in effect, a rotary converter is produced; and in which the number of phases utilized in the machine may be equal to, greater, or less than the number of phases of the A. C. supply.

Further objects of this invention are to provide a machine in which full benefit is secured of the reduction of losses inherent in a rotary converter, as compared with a D. C. generator of the same capacity; in which the additional reduction of losses due to a large number of phases may be secured irrespective of the number of phases of the A. C. supply; and in which both a D. C. voltage control and a power factor control are secured in a manner such that each is independent of the other.

Further objects are to provide a novel form of dynamo electric machine which has a synchronous motor provided with primary and secondary windings associated with a D. C. machine, with the secondary winding interconnected with the rotor winding of the D. C. machine in such a manner that both the converter action and the direct current dynamo action take place and are jointly effective in producing the terminal D. C. voltage; and in which the frequency impressed upon the rotor of the D. C. machine is the line frequency, although the number of phases of the interconnected windings may or may not be the same as the number of phases of the A. C. supply, depending upon the design of the particular machine.

Further objects are to provide a machine of the type set forth above in which the D. C. machine acts more nearly as a rotary converter all the time and under all conditions of load; in which the primary and secondary of the A. C. machine are located in the same slots; in which the secondary is embedded in the slots to secure a high reactance; and in which the field of the A. C. machine increases slightly with increase of load to maintain a substantially constant, predetermined power factor.

Further objects are to provide a machine which has a drooping external characteristic curve; which may have its open circuit voltage set at any desired predetermined value; in which a high impedance is inherently secured in the windings of the D. C. machine to prevent momentary, large local currents in the armature windings of the D. C. machine when the external resistance of the work circuit fluctuates rapidly, as in arc welding; and in which excessive current cannot circulate in the combined circuits of the two machines even when the resistance of the arc fluctuates rapidly, to thereby secure a stable arc.

Further objects are to provide a dynamo electric machine in which the secondary of the A. C. machine has a high impedance, and not only provides the necessary impedance in the arc circuit, but also directly cooperates to produce the desired drooping curve for the dynamo electric machine, and which, therefore, eliminates any form of external stabilizer, and also eliminates any form of internal stabilizer.

Further objects are to provide a dynamo electric machine which is suitable for any system where a variable voltage is desired, and which is particularly suitable for arc welding, as its characteristics, which may be controlled, are such that any desired open circuit voltage may be obtained, and also a predetermined short circuit current may be obtained.

Further objects are to provide a dynamo electric machine which has a relatively low initial cost, which has a very small resistance loss, which has a high efficiency, and which is most easily controlled to produce any desired open circuit voltage, short circuit current, or power factor.

An embodiment of the invention is shown in the accompanying drawings, in which:—

Figure 1:
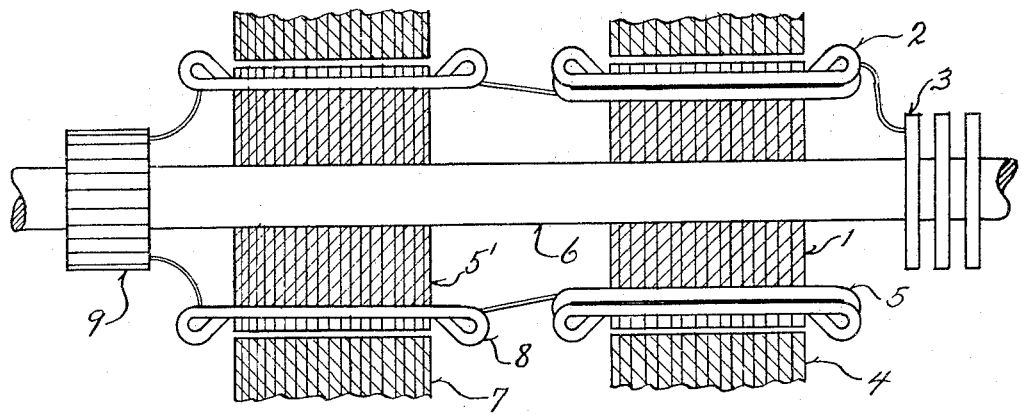
Figure 1 is a fragmentary view showing the rotors of the synchronous motor and direct current dynamo.

Referring to the drawings, it will be seen that the machine comprises a synchronous motor having a wound rotor 1 whose windings 2 are connected to slip rings 3. The rotor cooperates with a stator 4, a portion of which is shown in Figure 1. The rotor 1 of the A. C. machine is also provided with secondary windings 5, which, as will appear later, are mounted preferably in the same slots with the primary windings 2. The D. C. machine or dynamo is provided with a rotor 5' rigidly mounted upon the shaft 6, which carries the rotor 1 of the A. C. machine or synchronous motor. The dynamo rotor or armature cooperates with the field structure 7, a portion of which is shown in Figure 1. The armature 5' is provided with windings 8 which are connected at regular intervals to the segments of a commutator 9. Further the windings 8 of the D. C. machine are connected to the secondary 5 of the A. C. machine.

Figure 2:
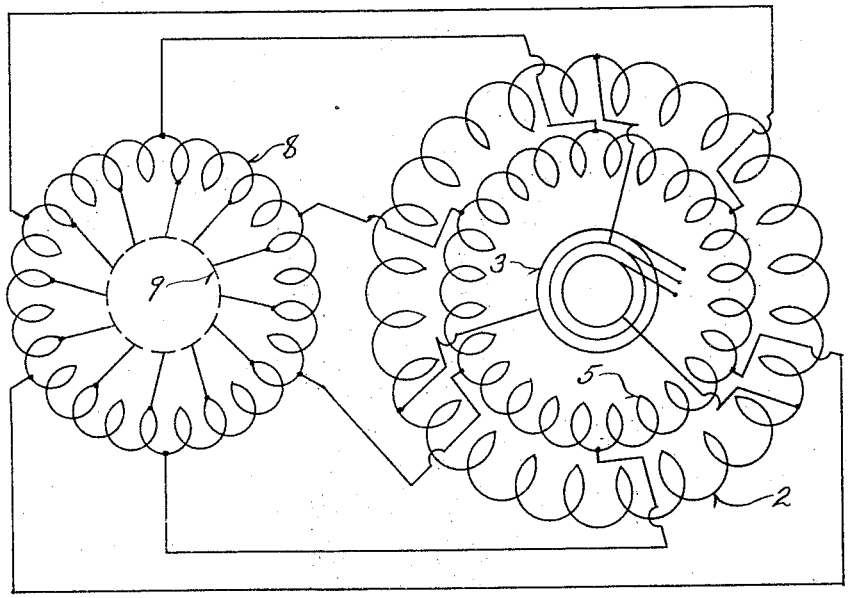
Figure 2 is a diagrammatic view showing the manner in which the windings of the rotors of the two machines are connected.

The connections for the windings of the A. C. and D. C. machines are most clearly shown in the diagrammatic view, Figure 2. Referring to this figure, it will be seen that the primary 2 and the secondary 5 of the A. C. machine and the windings 8 of the D. C. machine are shown as continuous windings, and the connections for the A. C. machine are such that a delta connection is provided. However, it is clear that any other form of connection could be employed; for instance, a Y connection could be used. At regular or equidistant points the windings 8 of the D. C. machine and the secondary 5 of the A. C. machine are connected. Preferably the connection is such as to utilized a large number of phases; for instance, in the form shown a six-phase connection is employed. The number of phases for the secondary may be anything desired, and is wholly independent of the number of phases of the primary 2. The primary 2 is shown as a three-phase winding, and is connected at three electrically equidistant points to the slip rings 3.

From the description thus far given it will be seen that the line frequency is directly impressed on the winding of the rotor of the D. C. machine. However, any voltage ratio may be employed between the primary 2 and the secondary 5 of the A. C. machine.

Figure 3:
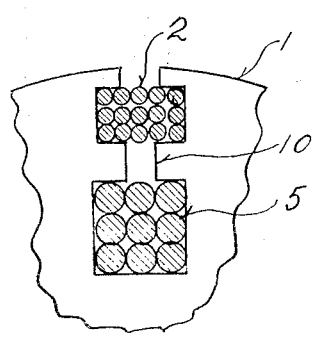
Figure 3 is a fragmentary sectional view through the rotor of the A. C. machine.

As shown in Figure 3, it is preferable to mount or position the primary windings 2 of the A. C. rotor 1 in the outer portion of the slots, and to position the secondary 5 within the inner portions of the slots. Preferably the secondary windings 5 are seated or located in the bottom of the slots, and the slots are so made that they have relatively narrow and extensive portions 10 which provide a predetermined leakage path for the flux encircling the secondary windings 5. This provides the necessary reactance for a purpose which will appear hereinafter. There is a direct transformer action between the primary and secondary windings of the A. C. machine. Any voltage ratio desired can obviously be obtained. In addition to this, the primary windings may be readily regrouped so as to adapt the machine for use with any line voltage; for instance, this construction permits the ready changing over of a machine from 220 volts to 440 volts, or any other change desired.

The current is taken from the commutator 9 of the D. C. machine by means of a plurality of brushes 11 connected in groups as shown in Figure 4.

Figure 4:
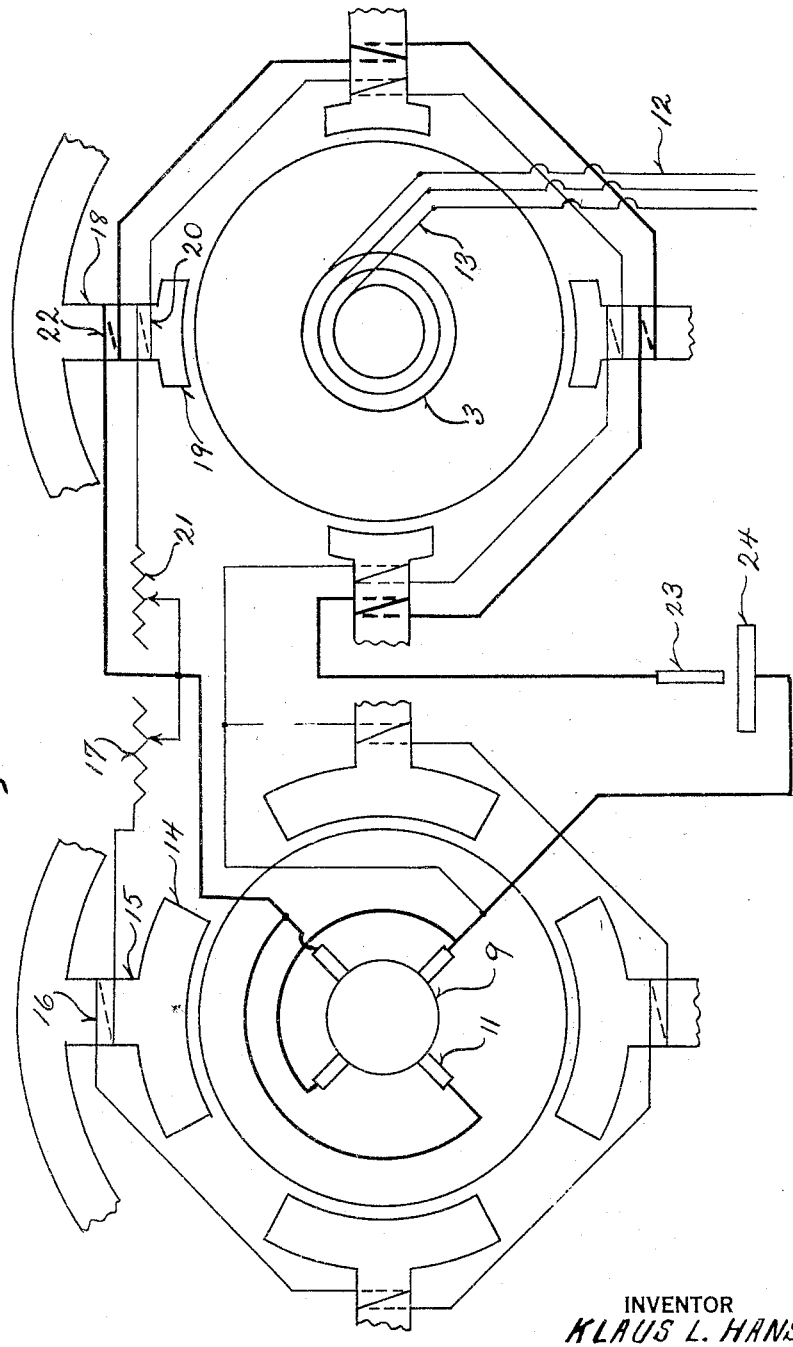
Figure 4 is a diagrammatic view showing the connections of the field windings and the field structure of the two machines and the supply and work circuits.

The supply mains for the alternating current are indicated at 12 in Figure 4, and are connected by means of the brushes 13 to the slip rings 3 of the A. C. machine.

The field structure of the D. C. machine may comprise a plurality of poles which have relatively wide pole faces 14 as compared with the necks or cores 15. These cores are each provided with a shunt winding 16 which may be connected in series and through a rheostat 17 to the groups of brushes 11 so that the field strength may be controlled. In addition to this, it is obvious that the brushes may also be shifted in the usual manner to utilize the effect of armature reaction to aid in producing a drooping curve.

It is to be noted that with this construction of the machine interpoles are not needed, as the machine functions primarily as a rotary converter. The construction of the field poles is such that the shifting of the field flux due to armature reaction is pronounced, which in itself materially aids in the production of a drooping curve characteristic.

The field structure of the A. C. machine may comprise a plurality of cores or field poles 18, which may be provided with the usual pole faces 19. These field poles are each provided with shunt windings 20, which are connected through a rheostat 21 to the groups of brushes 11 of the D. C. machine. It is preferable to provide in addition a series winding 22 for each field pole 18 of the A. C. machine, and this series winding is connected directly in series with the work circuit. The purpose of this winding is to increase the field strength of the A. C. machine as the load increases, so as to maintain the power factor at a predetermined value for which the machine is designed. This power factor may also be controlled by the rheostat 21 of the shunt winding.

The work circuit is indicated as comprising an electrode 23 and the work 24 between which an arc is maintained when the machine is used for arc welding.

The dynamo or D. C. machine is thus employed to furnish energy, not only for the work circuit, but also for the D. C. field windings of the two machines.

The winding of the armature of the D. C. machine is such that a large reactance is obtained. The purpose of this relatively large reactance is to suppress momentary large surge currents in the armature winding of the D. C. machine even when the resistance of the arc fluctuates rapidly. Further, the large reactance produced by the secondary windings of the A. C. rotor cooperates with the D. C. machine to stabilize the arc although its resistance may, as stated, fluctuate rapidly.

It is apparent from the disclosure that a true transformer action takes place between the primary and secondary windings of the A. C. rotor, and that any voltage ratio desired may thereby be obtained. In addition to this, as is obvious particularly from Figure 2, any number of phases may be employed for the secondary winding, that is to say, it may be tapped at a plurality of points and connected to corresponding points of the winding of the D. C. machine. Thus it is evident that the number of phases employed in this portion of the machine is wholly independent of the number of phases of the supply circuit. In the form chosen for illustration a three-phase supply circuit is indicated although a six-phase converter effect is produced. It is a well known fact that the losses in a converter are reduced as the number of phases are increased. It is, however, very unusual to find more than three phases for the supply system. However, this invention provides a machine which utilizes the advantage inherent in a large number of phases and is independent of the number of phases of the supply system.

It is also to be noted that the D. C. machine functions under all conditions primarily as a rotary converter, and thus the losses are reduced to a minimum.

In addition to this, there is great flexibility provided for voltage control of the D. C. machine. It does not have the fixed voltage ratio of the usual rotary converter. It is, therefore, free both from this fixed voltage ratio and also from the majority of losses in a D. C. dynamo of the same capacity.

In addition to these points, it is to be noted particularly that the power factor control is wholly independent of the output voltage control. One may be varied without affecting the other.

It is to be distinctly understood that although the fields of the two machines have been shown as stationary, obviously they could be made rotating and the armature structure of each machine could be made as the stator.

It is also apparent that the open circuit voltage of the machine as a whole can be predetermined by the setting of the rheostat for the direct current machine, and also by the design of the machine itself. Thus a great range in open circuit or no load voltage may be obtained. Further, due to the large reactance of the secondary winding which augments that of the D. C. winding, it is apparent that no external stabilizer is required. Thus the construction of the machine is vastly simplified and the machine constitutes a self-containing unit which is eminently suited to arc welding practice or any other service having similar requirements.

As a matter of fact most of the flux in the A. C. machine encircles both the primary and secondary windings at no load. As the load increases, there is an increasing leakage of the flux, so that a high reactance for the secondary winding is produced.

It will be seen, therefore, that a novel form of dynamo electric machine has been produced by this invention which is of relatively simple construction, which may be made by the ordinary practice in dynamo construction without requiring elaborate operations for its assembly. It will be seen further that the machine is self-contained and requires no external apparatus in order to adapt it for the widely varying demands as in arc welding.

It will be seen further that the utmost flexibility is afforded by this construction, and that no step-down transformers or other auxiliary equipment is required although there may be a relatively great change in voltage from the supply mains to the delivery circuit. This change in voltage is readily secured by the proper design of the machine and, as stated, without auxiliary apparatus.

The term armature is intended to cover either a rotor or a stator.

Although the invention has been described in considerable detail, such description is intended as illustrative rather than limiting, as the invention may be variously embodied and as the scope of such invention is to be determined as claimed.

I claim:—

1. The combination of a direct current dynamo and a synchronous motor, said dynamo supplying the current for energizing its fields, a work circuit connected to said dynamo, a field winding for said synchronous motor connected in series with said work circuit, said synchronous motor having a primary and a secondary winding, means for supplying said primary winding with alternating current, said secondary winding having a magnetic leakage path for increasing the reactance thereof, said secondary winding being connected at a plurality of points to the armature of said dynamo, whereby said dynamo functions primarily as a rotary converter supplied by said secondary winding.

2. The combination of a direct current dynamo having an armature provided with a winding and a synchronous motor, both said dynamo and said motor having fields provided with shunt windings supplied by said dynamo, a work circuit connected to said dynamo, a second field winding for said motor connected in series with said work circuit, said motor having a primary and a secondary winding, means for conducting alternating current to said primary winding, said secondary winding being connected at a plurality of points to the armature winding of said dynamo, said secondary winding having a high magnetic leakage path.

3. In a dynamo electric machine, the combination of an alternating current rotor and a direct current rotor, said alternating current rotor having a primary and a secondary winding thereon, said direct current rotor having a direct current winding connected to said secondary winding at a plurality of points, field structures for each of said rotors, means for producing a rapidly drooping volt-ampere curve for said secondary winding and a rapidly drooping volt-ampere curve for said direct current winding.

In testimony whereof, the signature of the inventor is affixed hereto.

KLAUS L. HANSEN.